United States Patent
Hosein et al.

(10) Patent No.: US 9,674,576 B2
(45) Date of Patent: Jun. 6, 2017

(54) METHODS AND SYSTEMS OF PROVIDING A SUPPLEMENTAL EXPERIENCE BASED ON CONCURRENTLY VIEWED CONTENT

(75) Inventors: Marc Peter Hosein, Saratoga, CA (US); Steve Yankovich, San Jose, CA (US); Selina Lam, Castro Valley, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/409,726

(22) Filed: Mar. 1, 2012

(65) Prior Publication Data

US 2012/0227073 A1    Sep. 6, 2012

Related U.S. Application Data

(60) Provisional application No. 61/447,962, filed on Mar. 1, 2011.

(51) Int. Cl.
*H04N 21/462* (2011.01)
*H04N 21/40* (2011.01)
(Continued)

(52) U.S. Cl.
CPC ......... *H04N 21/4622* (2013.01); *H04N 21/24* (2013.01); *H04N 21/2407* (2013.01); *H04N 21/40* (2013.01); *H04N 21/41* (2013.01); *H04N 21/4126* (2013.01); *H04N 21/43* (2013.01); *H04N 21/431* (2013.01); *H04N 21/442* (2013.01); *H04N 21/44008* (2013.01);
(Continued)

(58) Field of Classification Search
CPC .... H04N 21/24; H04N 21/2407; H04N 21/40; H04N 21/41; H04N 21/4126; H04N 21/43; H04N 21/431; H04N 21/442; H04N 21/44204; H04N 21/44222; H04N 21/45; H04N 21/4532; H04N 21/466; H04N 21/4668; H04N 21/47; H04N 21/4722; H04N 21/478; H04N 21/47815
USPC .......................................................... 725/86
See application file for complete search history.

(56) References Cited

U.S. PATENT DOCUMENTS 5,432,542 A    7/1995    Thibadeau et al.
5,960,411 A    9/1999    Hartman et al.
(Continued)

FOREIGN PATENT DOCUMENTS

WO    WO 2012118976 A2    9/2012
WO    WO-2012118976 A3    9/2012

OTHER PUBLICATIONS

"International Application Serial No. PCT/US2012/027292, Search Report mailed Jun. 7, 2012", 2 pgs.
(Continued)

*Primary Examiner* — Justin Shepard
(74) *Attorney, Agent, or Firm* — Schwegman Lundberg & Woessner, P.A.

(57) ABSTRACT

A method and a system to provide a supplemental experience based on concurrently viewed content is provided. The system comprises an identification module to identify, at a user device, concurrently viewed content assigned a content identifier via communication with one or more components of a home theatre. The system further comprises a curation module to identify one or more listings describing items for sale based on keywords mapped to the content identifier and provide a user interface including the listings to the user device.

18 Claims, 14 Drawing Sheets

(51) Int. Cl.

| | | |
|---|---|---|
| *H04N 21/41* | (2011.01) | |
| *H04N 21/478* | (2011.01) | |
| *H04N 21/442* | (2011.01) | |
| *H04N 21/24* | (2011.01) | |
| *H04N 21/45* | (2011.01) | |
| *H04N 21/431* | (2011.01) | |
| *H04N 21/47* | (2011.01) | |
| *H04N 21/466* | (2011.01) | |
| *H04N 21/4722* | (2011.01) | |
| *H04N 21/43* | (2011.01) | |
| *H04N 21/44* | (2011.01) | |
| *H04N 21/81* | (2011.01) | |
| *H04N 21/858* | (2011.01) | |

(52) U.S. Cl.
CPC . *H04N 21/44204* (2013.01); *H04N 21/44222* (2013.01); *H04N 21/45* (2013.01); *H04N 21/4532* (2013.01); *H04N 21/466* (2013.01); *H04N 21/4668* (2013.01); *H04N 21/47* (2013.01); *H04N 21/478* (2013.01); *H04N 21/4722* (2013.01); *H04N 21/47815* (2013.01); *H04N 21/812* (2013.01); *H04N 21/858* (2013.01)

(56) References Cited

U.S. PATENT DOCUMENTS

| | | | |
|---|---|---|---|
| 5,969,714 A | 10/1999 | Butcher | |
| 7,103,908 B2 | 9/2006 | Tomsen | |
| 7,353,183 B1 | 4/2008 | Musso | |
| 7,536,706 B1 | 5/2009 | Sezan et al. | |
| 7,668,821 B1 | 2/2010 | Donsbach et al. | |
| 7,725,362 B2 | 5/2010 | Weathers, Jr. | |
| 7,774,817 B2 | 8/2010 | Gupta | |
| 8,296,314 B2 | 10/2012 | Nemirofsky et al. | |
| 8,566,855 B2 | 10/2013 | Wong et al. | |
| 8,914,365 B2 | 12/2014 | Lenahan et al. | |
| 9,020,415 B2 | 4/2015 | Buehler et al. | |
| 9,301,015 B2 | 3/2016 | Lenahan et al. | |
| 2002/0065802 A1 | 5/2002 | Uchiyama | |
| 2004/0194148 A1* | 9/2004 | Schultz et al. | 725/122 |
| 2005/0055640 A1 | 3/2005 | Alten | |
| 2005/0120391 A1 | 6/2005 | Haynie et al. | |
| 2005/0138668 A1 | 6/2005 | Gray et al. | |
| 2005/0149987 A1* | 7/2005 | Boccon-Gibod et al. | 725/135 |
| 2007/0085858 A1* | 4/2007 | Takimoto | G06F 17/30864 345/619 |
| 2007/0089136 A1* | 4/2007 | Kumai et al. | 725/46 |
| 2008/0077703 A1 | 3/2008 | Lee | |
| 2008/0077965 A1 | 3/2008 | Kamimaki et al. | |
| 2008/0098450 A1* | 4/2008 | Wu et al. | 725/132 |
| 2008/0243816 A1 | 10/2008 | Chan et al. | |
| 2008/0244638 A1 | 10/2008 | Ryden | |
| 2008/0259222 A1 | 10/2008 | Hardacker et al. | |
| 2008/0263472 A1 | 10/2008 | Thukral et al. | |
| 2009/0049483 A1 | 2/2009 | Townsend et al. | |
| 2009/0055538 A1 | 2/2009 | Conradt et al. | |
| 2009/0106307 A1 | 4/2009 | Spivack | |
| 2009/0128335 A1 | 5/2009 | Leung | |
| 2009/0144772 A1 | 6/2009 | Fink et al. | |
| 2009/0300547 A1 | 12/2009 | Bates et al. | |
| 2010/0037277 A1 | 2/2010 | Flynn-Ripley et al. | |
| 2010/0060802 A1 | 3/2010 | Huegel | |
| 2010/0094729 A1 | 4/2010 | Gray et al. | |
| 2010/0146560 A1 | 6/2010 | Bonfrer et al. | |
| 2010/0211900 A1 | 8/2010 | Fujioka | |
| 2010/0229196 A1* | 9/2010 | Lee et al. | 725/39 |
| 2010/0235259 A1 | 9/2010 | Farraro et al. | |
| 2010/0260426 A1 | 10/2010 | Huang et al. | |
| 2010/0262987 A1 | 10/2010 | Imanilov et al. | |
| 2011/0032191 A1 | 2/2011 | Cooke et al. | |
| 2011/0078628 A1 | 3/2011 | Rosenberg | |
| 2011/0099064 A1 | 4/2011 | Lyon et al. | |
| 2011/0099069 A1 | 4/2011 | Hoelz et al. | |
| 2011/0134320 A1 | 6/2011 | Daly et al. | |
| 2011/0138300 A1 | 6/2011 | Kim et al. | |
| 2011/0208418 A1 | 8/2011 | Looney et al. | |
| 2011/0247042 A1* | 10/2011 | Mallinson | 725/86 |
| 2011/0321071 A1* | 12/2011 | McRae | 725/5 |
| 2012/0173385 A1 | 7/2012 | Fan et al. | |
| 2012/0198531 A1 | 8/2012 | Ort et al. | |
| 2012/0239535 A1 | 9/2012 | Leal | |
| 2012/0253972 A1 | 10/2012 | Oskolkov et al. | |
| 2012/0254927 A1 | 10/2012 | Kim et al. | |
| 2012/0290606 A1 | 11/2012 | Kumar et al. | |
| 2012/0304065 A1 | 11/2012 | Cai | |
| 2013/0030899 A1 | 1/2013 | Ehlers | |
| 2013/0051754 A1 | 2/2013 | Gilpin | |
| 2013/0117262 A1 | 5/2013 | Lenahan et al. | |
| 2013/0117788 A1 | 5/2013 | Glasgow | |
| 2013/0152128 A1 | 6/2013 | Tanna et al. | |
| 2014/0201230 A1 | 7/2014 | Messer et al. | |
| 2014/0282743 A1 | 9/2014 | Howard et al. | |
| 2014/0310754 A1 | 10/2014 | Collart et al. | |
| 2014/0316935 A1 | 10/2014 | Robertson | |
| 2015/0089529 A1 | 3/2015 | Lenahan et al. | |
| 2016/0156980 A1 | 6/2016 | Lenahan et al. | |

OTHER PUBLICATIONS

"International Application Serial No. PCT/US2012/027292, Written Opinion mailed Jun. 7, 2012", 5 pgs.

"U.S. Appl. No. 13/566,829, Final Office Action mailed Nov. 4, 2013", 17 pgs.

"U.S. Appl. No. 13/566,829, Non Final Office Action mailed May 7, 2013", 15 pgs.

"U.S. Appl. No. 13/566,829, Notice of Allowance mailed Aug. 15, 2014", 13 pgs.

"U.S. Appl. No. 13/566,829, Response filed Mar. 4, 2014 to Final Office Action mailed Nov. 4. 2013", 11 pgs.

"U.S. Appl. No. 13/566,829, Response filed Aug. 6, 2013 to Non Final Office Action mailed May 7, 2013", 15 pgs.

"U.S. Appl. No. 13/566,857, Examiner Interview Summary mailed May 13, 2016", 3 pgs.

"U.S. Appl. No. 13/566,857, Final Office Action mailed Aug. 25, 2015", 18 pgs.

"U.S. Appl. No. 13/566,857, Final Office Action mailed Nov. 14, 2013", 17 pgs.

"U.S. Appl. No. 13/566,857, Non Final Office Action mailed Jan. 14, 2016", 19 pgs.

"U.S. Appl. No. 13/566,857, Non Final Office Action mailed May 6, 2015", 16 pgs.

"U.S. Appl. No. 13/566,857, Non Final Office Action mailed Jun. 13, 2013", 11 pgs.

"U.S. Appl. No. 13/566,857, Response filed Feb. 13, 2014 to Final Office Action mailed Nov. 14, 2013", 13 pgs.

"U.S. Appl. No. 13/566,857, Response filed Apr. 26, 2016 to Non Final Office Action mailed Jan. 14, 2016", 14 pgs.

"U.S. Appl. No. 13/566,857, Response filed Jul. 6, 2015 to Non Final Office Action mailed May 6, 2015", 11 pgs.

"U.S. Appl. No. 13/566,857, Response filed Sep. 10, 2013 to Non Final Office Action mailed Jun. 13, 2013", 12 pgs.

"U.S. Appl. No. 13/566,857, Response filed Sep. 23, 2015 to Final Office Action mailed Aug. 25, 2015", 12 pgs.

"U.S. Appl. No. 14/159,352, Final Office Action mailed Feb. 4, 2015", 12 pgs.

"U.S. Appl. No. 14/159,352, Final Office Action mailed May 22, 2016", 12 pgs.

"U.S. Appl. No. 14/159,352, Final Office Action mailed Sep. 11, 2015", 14 pgs.

"U.S. Appl. No. 14/159,352, Non Final Office Action mailed Mar. 28, 2016", 15 pgs.

"U.S. Appl. No. 14/159,352, Non Final Office Action mailed Oct. 6, 2014", 11 pgs.

"U.S. Appl. No. 14/159,352, Response filed Jan. 6, 2015 to Non Final Office Action mailed Oct. 6, 2014", 13 pgs.

(56) References Cited

OTHER PUBLICATIONS

"U.S. Appl. No. 14/159,352, Response filed Jan. 11, 2016 to Final Office Action mailed Sep. 11, 2015", 13 pgs.
"U.S. Appl. No. 14/159,352, Response filed May 4, 2015 to Non Final Office Action mailed Feb. 4, 2015", 13 pgs.
"U.S. Appl. No. 14/159,352, Response filed Jun. 28, 2016 to Non Final Office Action mailed Mar. 28, 2016", 14 pgs.
"U.S. Appl. No. 14/159,352, Response filed Aug. 24, 2015 to Non Final Office Action mailed May 22, 2015", 17 pgs.
"U.S. Appl. No. 14/559,661, Notice of Allowance mailed Sep. 21, 2015", 18 pgs.
"U.S. Appl. No. 14/559,661, Notice of Allowance mailed Nov. 20, 2015", 18 pgs.
"U.S. Appl. No. 14/559,661, Preliminary Amendment filed Dec. 15, 2014", 7 pgs.
"U.S. Appl. No. 15/015,336, First Action Interview—Pre-Interview Communication mailed Jul. 15, 2016", 5 pgs.
"U.S. Appl. No. 15/015,336, Preliminary Amendment filed Feb. 25, 2016", 6 pgs.
"International Application Serial No. PCT/US2012/027292, International Preliminary Report on Patentability mailed Mar. 13, 2014", 7 pgs.
"U.S. Appl. No. 13/566,857, Notice of Allowance mailed Aug. 26, 2016", 7 pgs.
"U.S. Appl. No. 14/159,352, Final Office Action mailed Oct. 6, 2016", 22 pgs.
"U.S. Appl. No. 15/015,336, Examiner Interview Summary mailed Sep. 30, 2016", 3 pgs.
"U.S. Appl. No. 15/015,336, Response filed Aug. 9, 2016 to First Action Interview—Pre-Interview Communication mailed Jul. 15, 2016", 2 pgs.
U.S. Appl. No. 13/566,857, filed Aug. 3, 2012, User Commentary Systems and Methods.
U.S. Appl. No. 15/015,336, filed Feb. 4, 2016, User Commentary Systems and Methods.
U.S. Appl. No. 14/159,352, filed Jan. 20, 2014, Shoppable Video.

\* cited by examiner

108

1200

ITEM CHECK-OUT

SHOPPING CART

ITEM 1: JUDGE'S WATCH
QUANTITY: 1
PRICE: $72

SHIPPING & TAX: $22

ORDER TOTAL: $94

YOUR INFORMATION

NAME:

SHIPPING ADDRESS:

PAYMENT METHOD:

SUBMIT ORDER

*FIG. 12*

METHODS AND SYSTEMS OF PROVIDING A SUPPLEMENTAL EXPERIENCE BASED ON CONCURRENTLY VIEWED CONTENT

This application claims the priority benefit of U.S. Provisional Application No. 61/447,962, filed Mar. 1, 2011 and entitled "SHOPPING EXPERIENCE BASED ON CONCONCURRENTLY VIEWED CONTENT," which is incorporated herein by reference.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2011, 2012, All Rights Reserved.

TECHNICAL FIELD

The present application relates generally to the technical field of data management and communication and, in one specific example, to methods and systems of providing a supplemental experience based on conconcurrently viewed content.

BACKGROUND

People view broadcast content using television sets or other display devices. The broadcast content includes television shows, televised events, and other content. In some instances, a set-top box connected to a television set may provide additional information about the broadcast content, including a schedule of the broadcast content on various television channels. The set-top box may provide a description about broadcast content concurrently being viewed by the user or broadcast content that is included in the schedule of broadcast content.

BRIEF DESCRIPTION OF THE DRAWINGS

Some embodiments are illustrated by way of example and not limitation in the figures of the accompanying drawings in which:

FIG. 12 depicts an example portion of a user interface provided by a user device that includes an example supplemental experience to complete a transaction for the selected item for sale.

DETAILED DESCRIPTION

Example methods and systems to provide a supplemental experience based on conconcurrently viewed content are described. In the following description, for purposes of explanation, numerous specific details are set forth in order to provide a thorough understanding of example embodiments. It will be evident, however, to one skilled in the art that the present invention may be practiced without these specific details.

While a user is watching television, the user may be bored, looking to multi-task, or desire more information about the show. The user may not want to interrupt the television programming by navigating to a menu on the television. Instead, the user may have a second user device that is capable of identifying the televised content concurrently viewed by the user.

Upon identifying the content viewed by the user, the user may use the second device to browse a curated collection of items for sale that are related to the concurrently viewed content. In some instances, the user may navigate to view real-time media associated with the concurrently viewed content. In further instances, show metadata may be used to identify other content of interest such as items for sale and local organizations.

In instances where the supplemental experience includes a shopping experience, the user may search for and purchase items using the user device while watching television.

Accordingly, one or more of the methodologies discussed herein may obviate a need for computationally intensive queries, which may have the technical effect of reducing computing resources used by one or more devices within the system. Examples of such computing resources include, without limitation, processor cycles, network traffic, memory usage, storage space, and power consumption.

Figure 1:
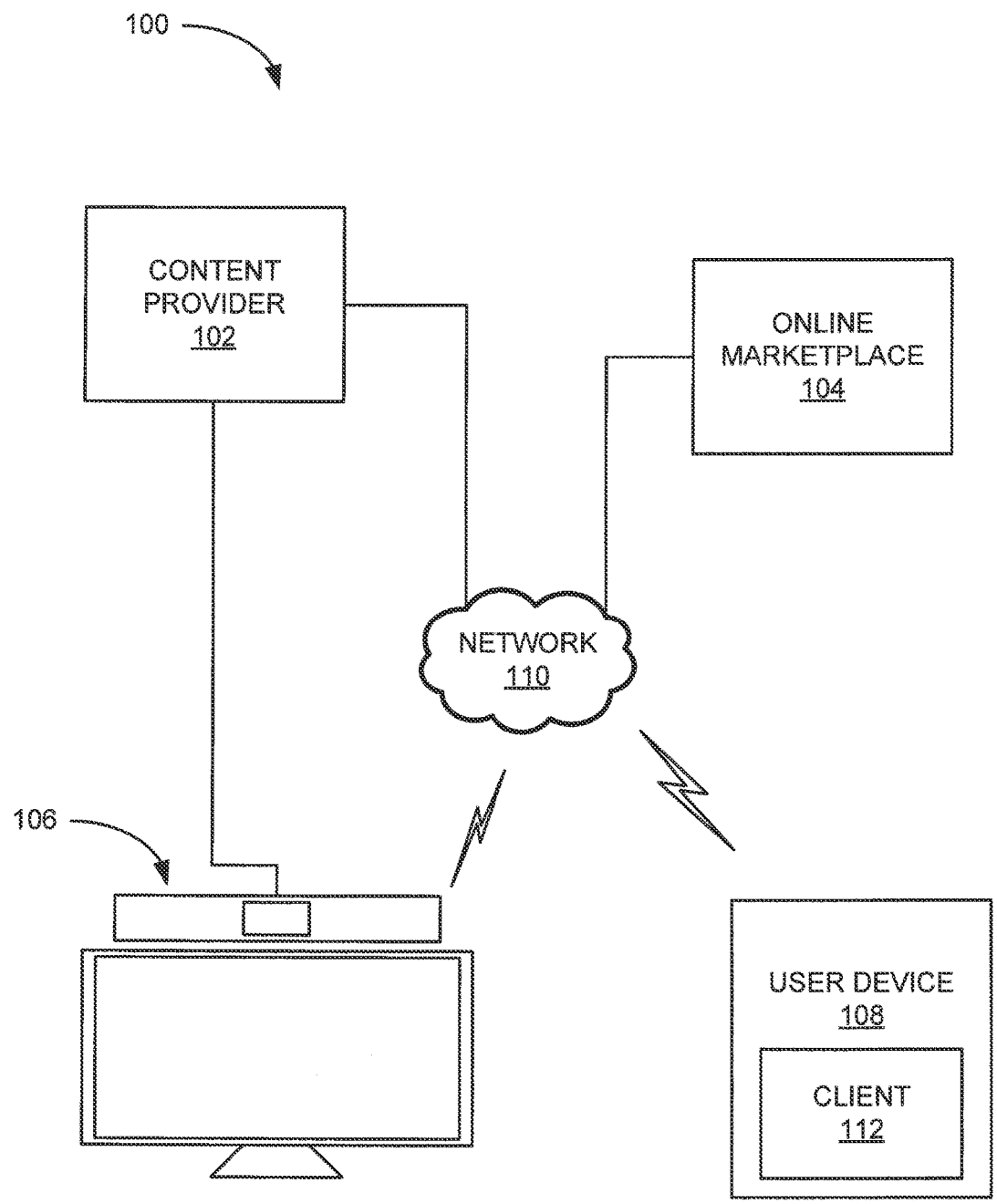
FIG. 1 depicts an exemplary environment in which various embodiments may be implemented.

FIG. 1 depicts an exemplary environment 100 in which various embodiments may be implemented. The environment includes one or more televised content providers 102 such as broadcasters, cable providers, fiber optic providers, satellite TV providers, and other content providers as discussed below. The content providers may communicate directly or indirectly with a home theatre 106. The home theatre 106 may include a television set and a content delivery device such as a set-top box, a digital video recorder (DVR), a game console, or other devices used to deliver content to a television set. Some content providers 102 may communicate over a dedicated network (e.g., a cable network) or via the Internet using a network 110.

An online marketplace 104 communicates via the network 110 to provide a shopping experience to one or more users. One example of an online marketplace 104 is eBay.com provided by eBay, Inc. of San Jose, Calif.

A user is associated with a primary and a secondary device. A primary device may be a television or a screen within the home theatre 106 that displays content provided by the content provider 102. The television may communicate with the content provider 102 via a set-top box included in the home theatre 106. The set-top box may additionally be configured to communicate via the network 110, such as a local wi-fi network.

The user is further associated with a secondary device, such as a user device 108. The user device 108 may include a mobile device, tablet device, laptop computer, or desktop computer. The secondary device may be configured to communicate with the online marketplace 104 and the content provider 102 via the network 110 using a combination of the Internet, local wi-fi network, and the set-top box. In some instances, the user device may execute a client 112 to access the online marketplace 104.

Figure 2:
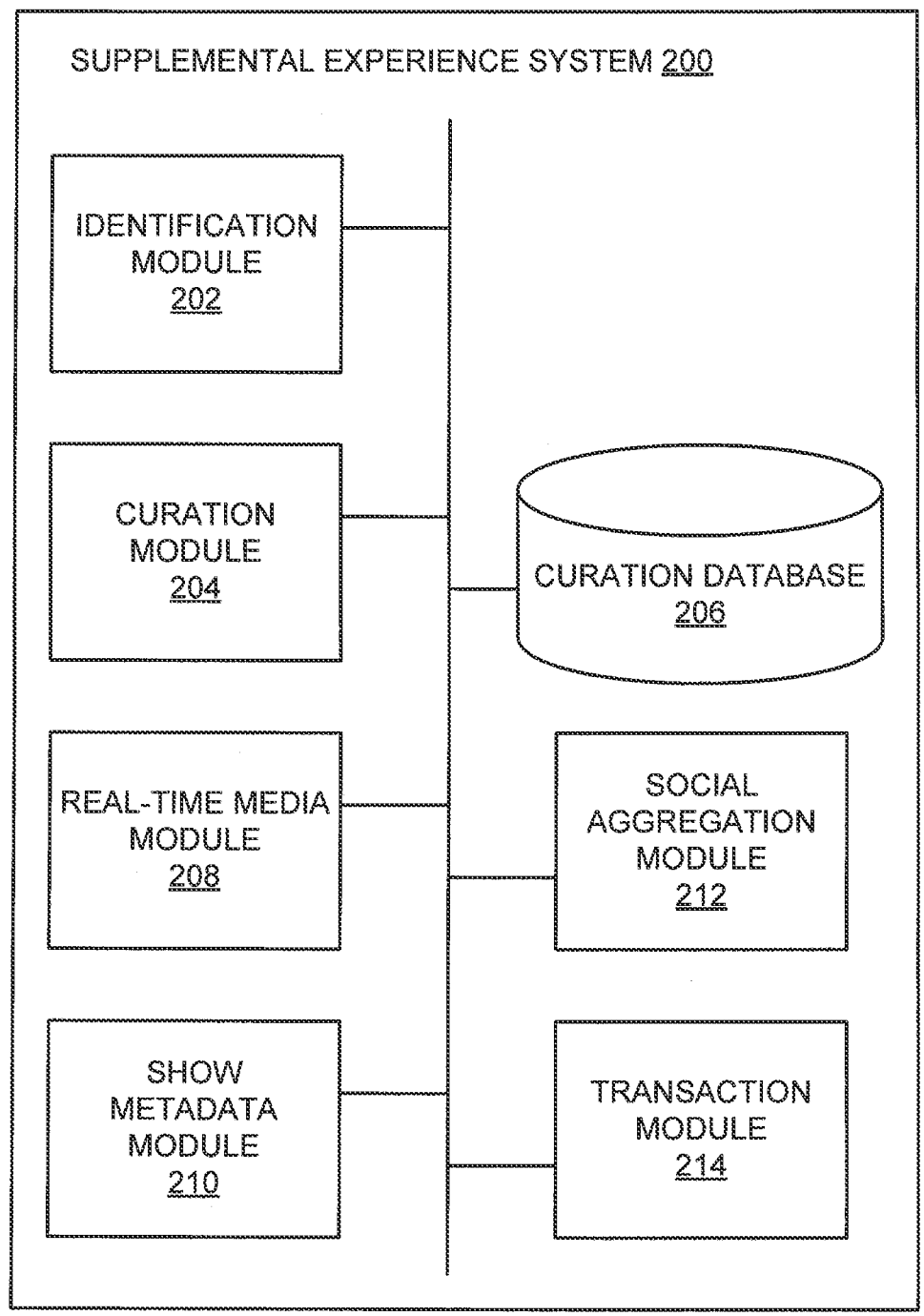
FIG. 2 is a block diagram of an example system, according to various embodiments.

FIG. 2 is a block diagram of an example supplemental experience system 200, according to various embodiments. The supplemental experience system 200 may be hosted by the online marketplace 104 or by another entity. In some instances, portions of the supplemental experience system 200 may be hosted at the user device 108 and accessed via the client 112.

An identification module 200 is configured to identify concurrently viewed content at the home theatre 106. In some instances, the client 112 of the user device 108 obtains information about what the consumer is viewing from the content provider 110. The content provider may expose user information using various methods, but essentially, the client 112 installed on the user device 108 identifies what the user is concurrently watching (whether live or from DVR), which programs the user has recorded, and offer a remote control mechanism that interacts with various components of the home theatre 106. Some examples of the communication mechanism between the user device 108, the content provider 102, and the home theatre 106 include an application that is executed by a set-top box in the home theatre 106. This application may communicate with the user device 108 via the network 110. Another communication mechanism includes satellite receiver included in the home theatre 106 that has a built-in web api control interface that the user device 108 can invoke via the network 110 to enable the user device 108 to send commands to the satellite receiver.

Upon successful identification of concurrently viewed content, a curation module 204 is configured to identify one or more items for sale. The curation module 204 may gather data about the concurrently viewed content from a television listing service, such as the Tribune Media Service (TMS).

In other instances, the curation module 204 may access one or more curated collections stored in connection with an identifier of the concurrently viewed content. The curated collections may be curated based on one or more keywords or categories associated with the concurrently viewed content. Various keywords or categories mapped to content may be stored in a curation database 206 according to a content identifier. A plurality of televised content items may be mapped to one or more categories or sets of categories. For example, a sports game viewed by a user may be mapped in the curation database 206 to product categories such as sporting equipment, tickets, memorabilia, and items selected by a celebrity player.

The curation module 204, upon identifying categories or keywords, may submit those categories or keywords to the online marketplace 104. In response, the online marketplace 104 may provide access to listings describing items for sale corresponding to the keywords or categories. The listings, or portions thereof, may be presented to the user via the client 112 of the user device 108.

In some embodiments, when concurrently viewed content is a live event or related a live event, the curation module 204 may allow a user to connect to a marketplace specializing in facilitating transactions for tickets to future live events. The curation module 204 may allow a user, using the user device 108, to select a future event, select a number of tickets or seat numbers, and purchase one or more tickets to the event.

A real-time media module 208 is configured to access real-time media such as blog posts, status messages, chat room conversations, microblogs, and other updates relating to the concurrently viewed content. The related content may be identified based on a website or chat room provided in connection with the content, a hashtag or other identifier included in the real-time media, or the like.

The real-time media module 208 may further identify keywords or product names mentioned in the real-time media that identify products or items available for sale in the online marketplace 104. In response, the online marketplace 104 may provide access to listings describing items for sale corresponding to the keywords or product names. The listings, or portions thereof, may be presented to the user via the client 112 of the user device 108.

A show metadata module 210 may access metadata about a show provided by one or more sources including, for example, the content provider 102. The metadata may include show updates, clips related to the show, descriptions of items appearing in the show, and other information. Based on the metadata, the online marketplace 104 may provide access to listings describing items for sale corresponding to the keywords or product names. The listings, or portions thereof, may be presented to the user via the client 112 of the user device 108.

In some instances, the metadata may be collected using one or more image recognition technologies or audio recognition technologies to automatically identify items or people appearing in the show. The image recognition technology may identify a main character or an item in a particular scene. For example, screen scraping technologies may be used to isolate an item, such as a timepiece appearing in a scene. The time piece may be identified using, for example, image recognition or character recognition. Audio recognition or closed captioning technologies may also be used to identify keywords associated with products related to the televised content. In some instances, data collected by the real-time media module 208 may be used to tag items of interest as candidates for recognition. For example, if a number of real-time media outlets comment on a timepiece worn by a character, the character and the timepiece may be scraped from a scene to identify the timepiece by designer, model, or other identifier. The identification of the timepiece may then be submitted to the online marketplace 104 as a query to return listings describing the timepiece or similar timepieces.

A social aggregation module 212 is configured to, based on the keywords, categories, and metadata, identify real-world activities that may be of interest to the viewer. The social aggregation module 212 may identify a geographic location of the viewer. Based on the concurrently viewed content and the location of the user, one or more activities may be identified that are of interest to the user. For example, if the viewer is viewing a show about cars, the social aggregation module 212 may identify a local car enthusiast club, local classifieds describing cars, local businesses related to cars, upcoming car-related events, and the like.

A transaction module 214 is configured to facilitate transaction processing for items selected by the user using the supplemental experience system 200. The transaction module 214 may manage a shopping cart associated with the user and receive or access shipping and payment information of the user. In instances where multiple purchasing options are available to the user, such as ticket sales where a user may select a seats corresponding to the purchased tickets.

Figure 3:
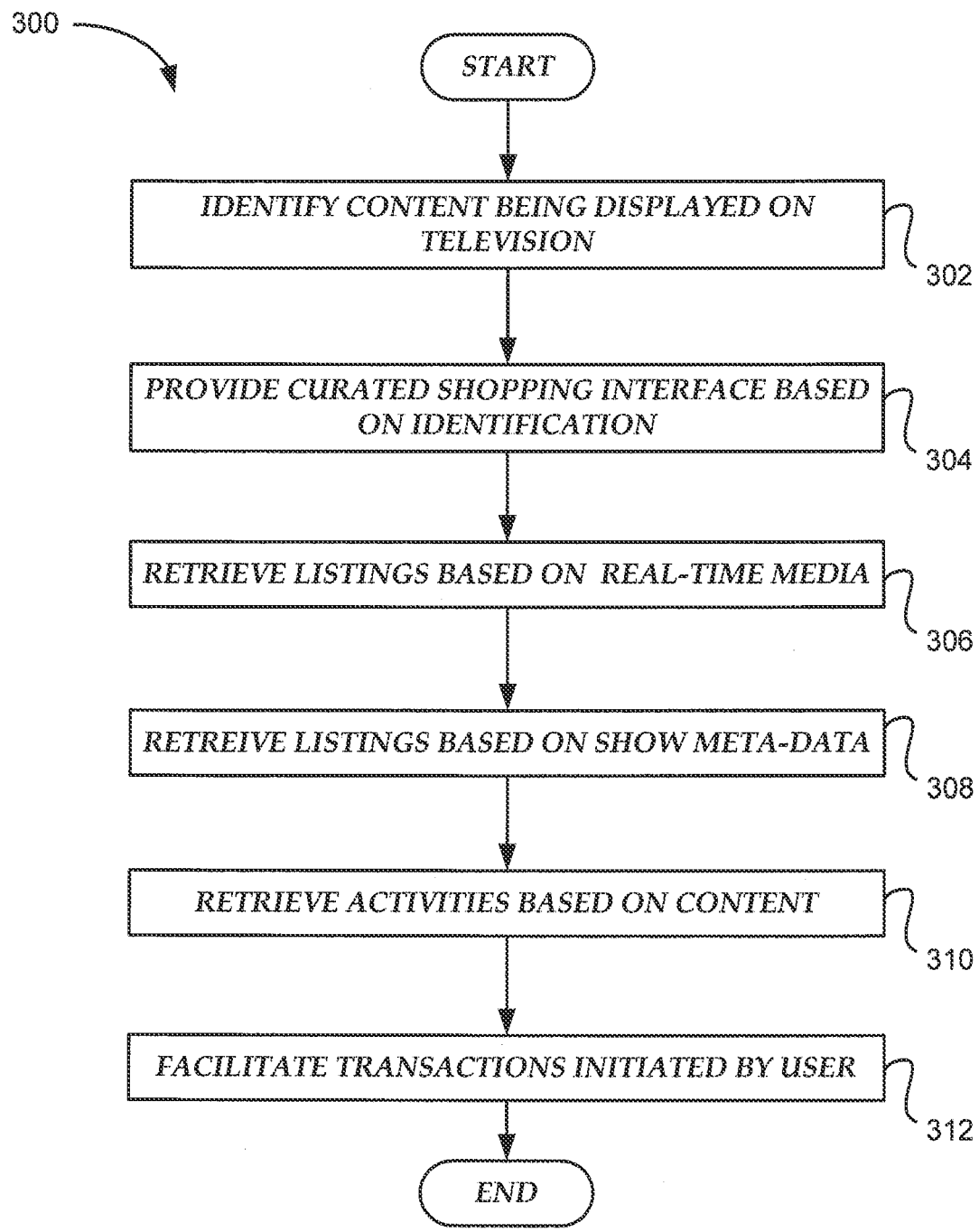
FIG. 3 is a flowchart illustrating an example method, according to various embodiments.

FIG. 3 is a flowchart illustrating an example method 300, according to various embodiments. The method 300 may performed by the supplemental experience system 200. It is noted that only a subset of the operations included in the method 300 may be performed in some instances.

In an operation 302, concurrently viewed content is identified based on a functionality exposed by a component of the home theatre 106. For example, a wi-fi-enabled cable set-top box may wirelessly transmit an identification of concurrently viewed content to the user device 108. In some embodiments, the identification of the concurrently viewed content may be provided by a user of the user device 108 by selecting a content identifier via a menu or schedule of televised content. In some instances, the user, using user device 108 may select or identify televised content that the user is not concurrently viewing.

In an operation 304, a curated shopping interface is provided based on the identified televised content. The curated shopping interface may include descriptions of categories of items for sale or descriptions of items for sale that are related to the televised content. The determination that the category or item is related may be based on keywords or categories mapped to a content identifier in the curation database 206. In some instances, the curation module 204 is configured to provide the curated shopping interface.

In an operation 306, real-time media relating to the identified content is determined. The real-time media may be determined based on a location where the media was published (e.g., a website dedicated to the identified content), keywords included in the real-time media, or identifiers of the content included in the media such as links or hashtags. The real-time media module 208 may generate a user interface including at least a portion of the real-time media or links to the real-time media.

The real-time media may be scraped or searched to identify keywords or categories of items relevant to the identified content. Based on the keywords or categories, one or more listings describing items for sale may be retrieved by the online marketplace 104. In some instances, the user interface generated by the real-time media module 208 may further include links to or portions of the one or more listings.

In an operation 308, show metadata is collected and analyzed to retrieve listings from the online marketplace 104 based on the content. The show metadata may include information about the televised content, about events occurring within the televised content, or information tagged or scraped from the show. For example, information about the show may include the names of actors, players, contestants, or other people associated with the televised content. Other information may include a genre, character names, a time period, a title, a short description, or the like. Events occurring within the televised content may include a plot summary, a score board, a leader board, a description of one or more scenes, live feeds, or the like. For example, a live feed may include real-time data that identifies a player who scored in a game or a nominee who won an award. Information tagged or scrapped from the televised broadcast may also be included in the metadata, either as an image or as a description of an item in an image.

Based on keywords or other information included in the metadata, listings describing items for sale are retrieved via the online marketplace 104. The listings may be provided to the user via the client 112 of the user device 108 in a user interface generated by the show metadata module 210.

In an operation 310, a social aggregation module 212 may retrieve information about real-world activities based on the content viewed by the user. The real-world activities may be identified according to one or more of the keywords or categories identified by in operations 304, 306, or 308. The real-world activities may be retrieved via local organizations, local advertisers, and other sources of local information. The social aggregation module 212 may further provide a user interface to present the real-world activities to the user. In some instances, the user may sign up, set up appointments, or purchase tickets to real-world activities via the social aggregation module 312.

In an operation 312, one or more transactions are facilitated by the transaction module 214 based on the listings retrieved in operations 304, 306, or 308. The operation 312 may further include facilitating transactions based on the real-world activities of operation 310. Facilitating transactions may include retrieving a shopping cart identifying items to be purchased, collecting or accessing user information, and processing the transaction within the online marketplace 104.

Figure 4:
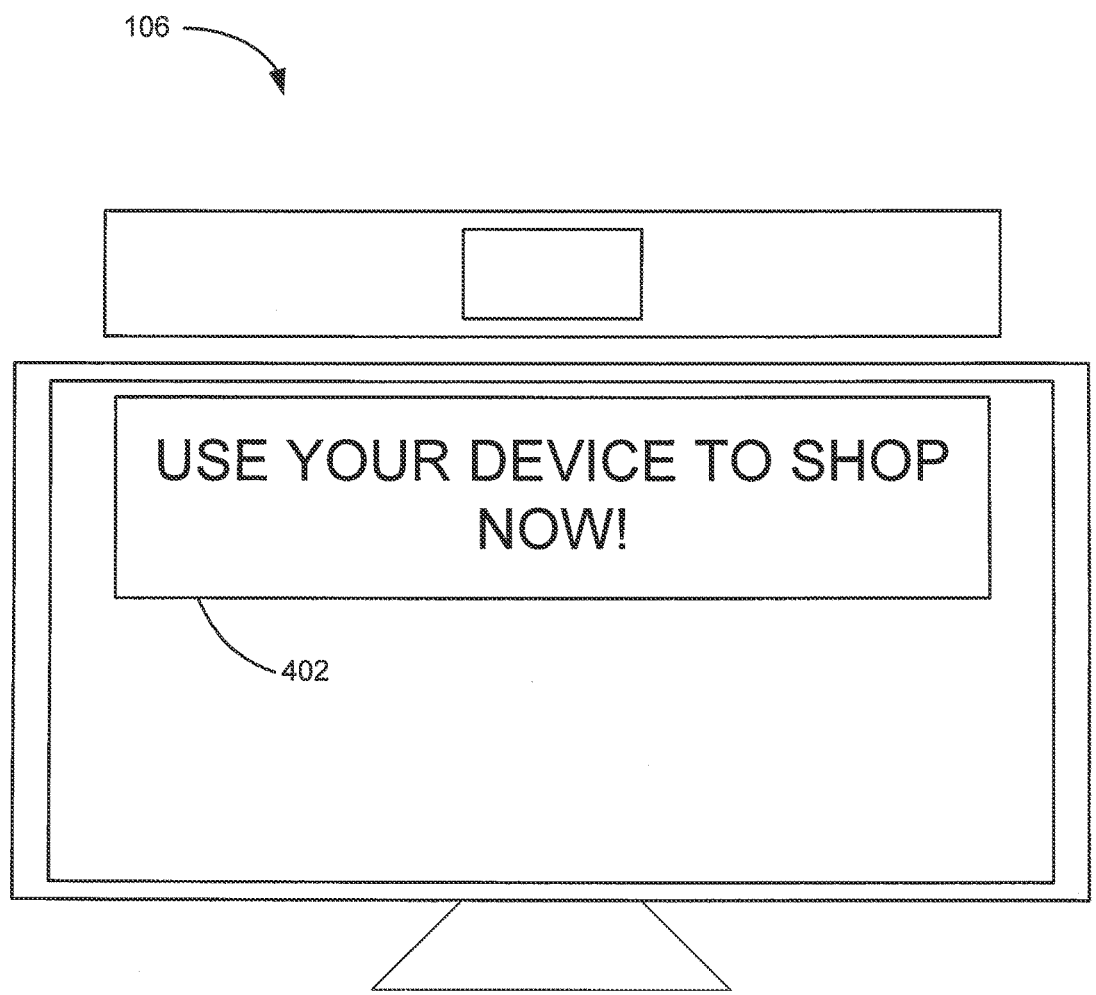
FIG. 4 depicts an example portion of a display displayed by a television set depicting an example message indicating that a supplemental experience is available to the viewer.

FIG. 4 depicts an example portion of a display displayed by a television set within a home theatre 106 depicting an example message 402 indicating that a supplemental experience is available to the viewer. The message 402 may appear within the display of the home theatre 106 (e.g., a television) and inform a viewer that items in connection with the content being shown are available for purchase through a web-enabled application. The message 402 may persist for a predefined period of time on the television. In some instances, the message 402 may be displayed after the concurrently viewed content is identified. If a viewer changes the channel being watched on the television, the message 402 may be updated to reflect the changed channel. In some instances, the message 402 includes an identifier, such as a logo, of the concurrently viewed content.

Figure 5:
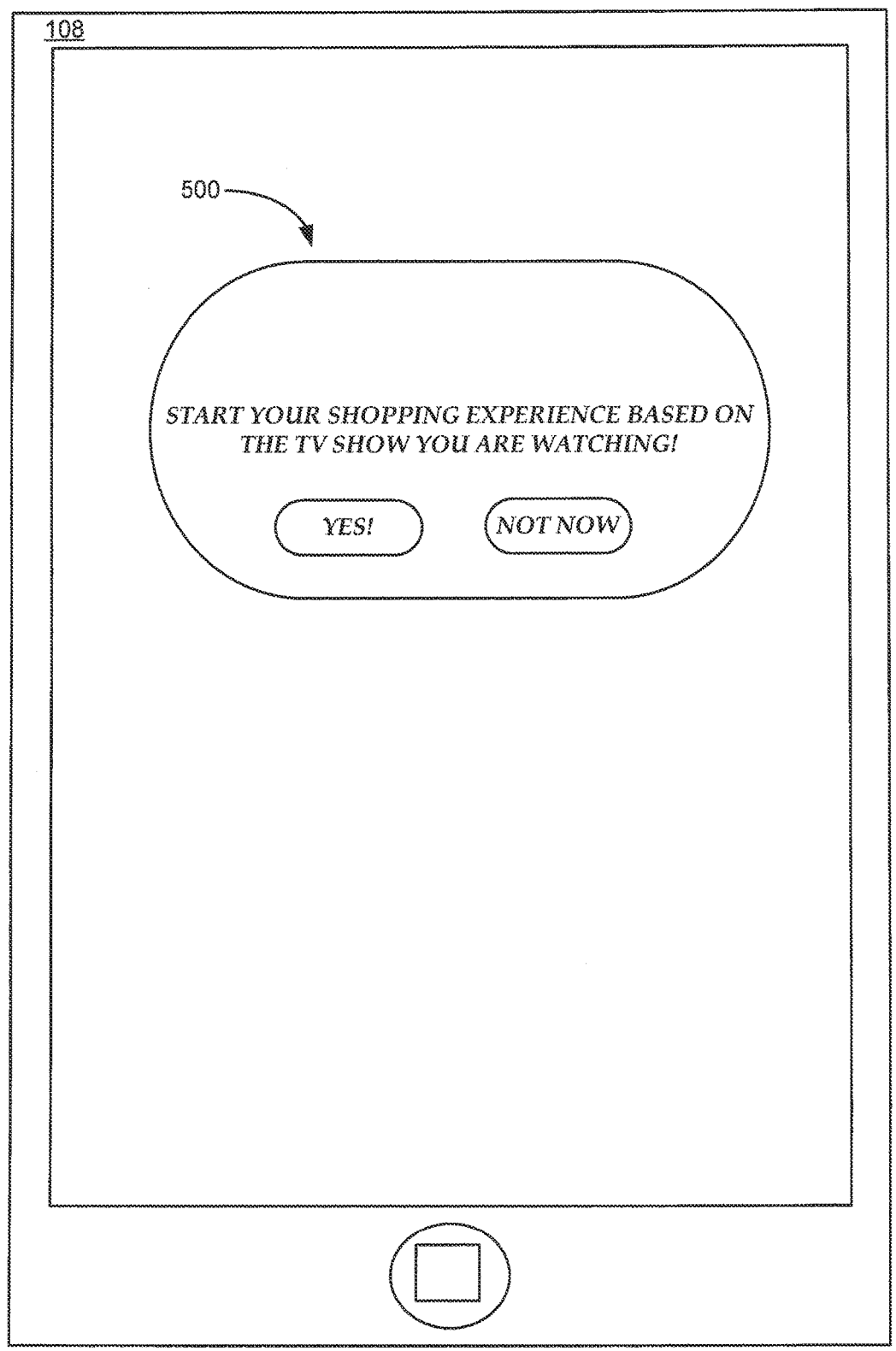
FIG. 5 depicts an example portion of a user interface provided by a user device that notifies the user that a supplemental experience is available.

FIG. 5 depicts an example portion of a user interface provided by a user device 108 that notifies the user that a supplemental experience is available. The user interface may include a notification 500 that momentarily appears on the user device 108. The notification 500 may identify the concurrently viewed content and provide the use with an option to begin a supplemental experience, such as a shopping experience. In other instances, the notification 500 may indicate that a supplemental experience is available.

Figure 6:
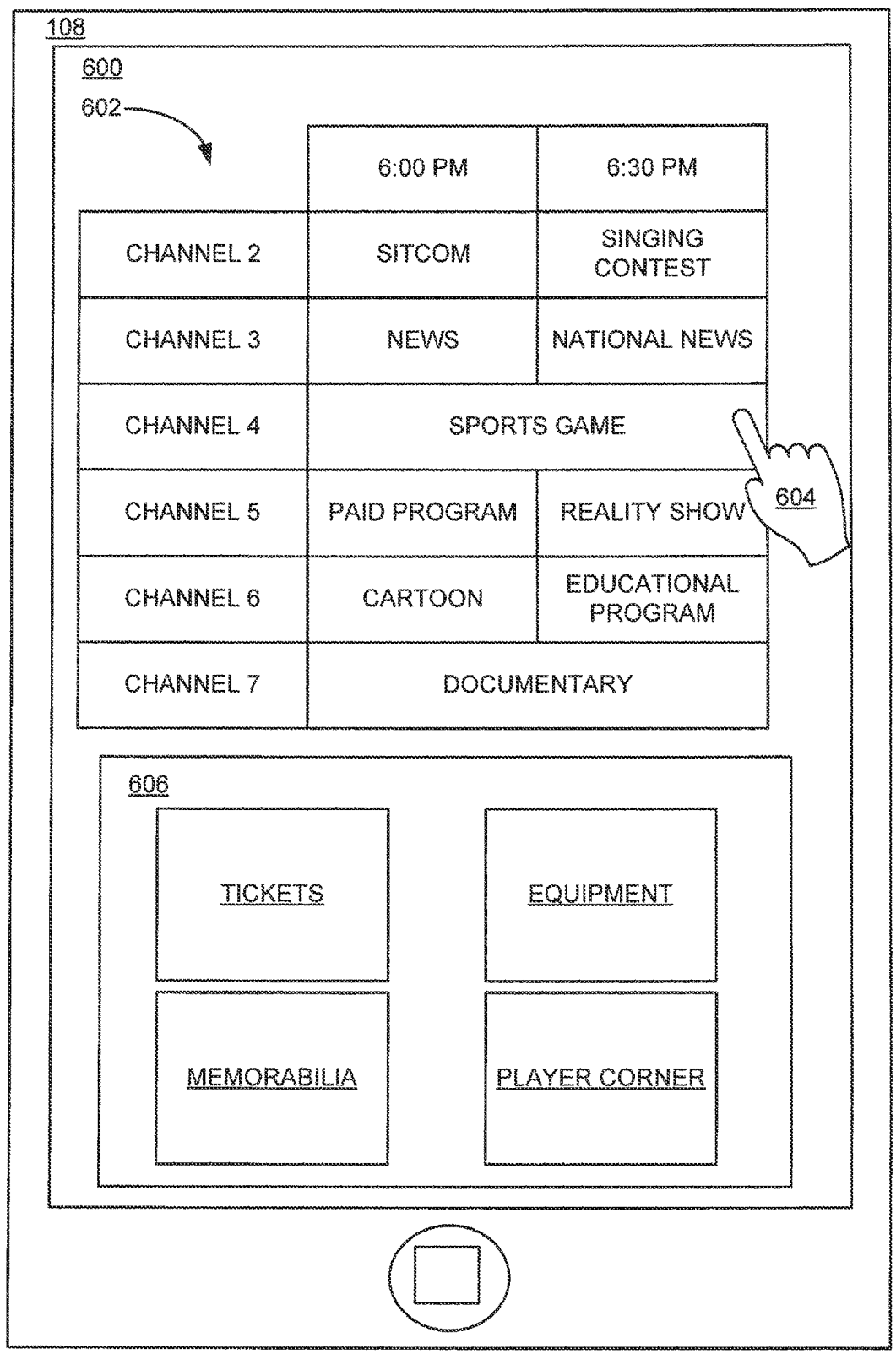
FIG. 6 depicts an example portion of a user interface provided by a user device that includes a schedule of broadcast content and an option to begin a supplemental experience.

FIG. 6 depicts an example portion of a user interface 600 provided by a user device 108 that includes a schedule of broadcast content and an option to begin a supplemental experience. If the user decides to begin the supplemental experience, the client 112 may generate or retrieve an interface such as interface 600. The interface 600 may include information 602 about televised content on a portion of the channels available to the user. As shown, the information 602 may be generated according to broadcast schedules and a channel listing. In some embodiments, the information 602 may be generated based on a queue of recorded or on-demand shows associated with the user.

In some instances, the user, using a cursor control 604 (such as a touchscreen) may select a description of specific content included in information 600. In response to the selection, the user may navigate to a supplemental experience generated based on the specific content. In some instances, the selection of the specific content may further cause the user device 108 to communicate the selection to the set-top box in the home theatre 106 and cause the set-top box to display the selected content on the television in the home theatre 106.

The interface 600 may further include supplemental experience portion 606 that provides content about the concurrently viewed content or about the content selected by the user. As depicted, the portion 606 includes links to categories of items for sale related to the "sports game" content selected by the user using cursor control 604 and accessed by the curation module 204. The portion 606 may be generated based on information accessed by the curation module 204, the real-time media module 208, the show metadata module 210, the social aggregation module 212, or some combination thereof.

Figure 7:
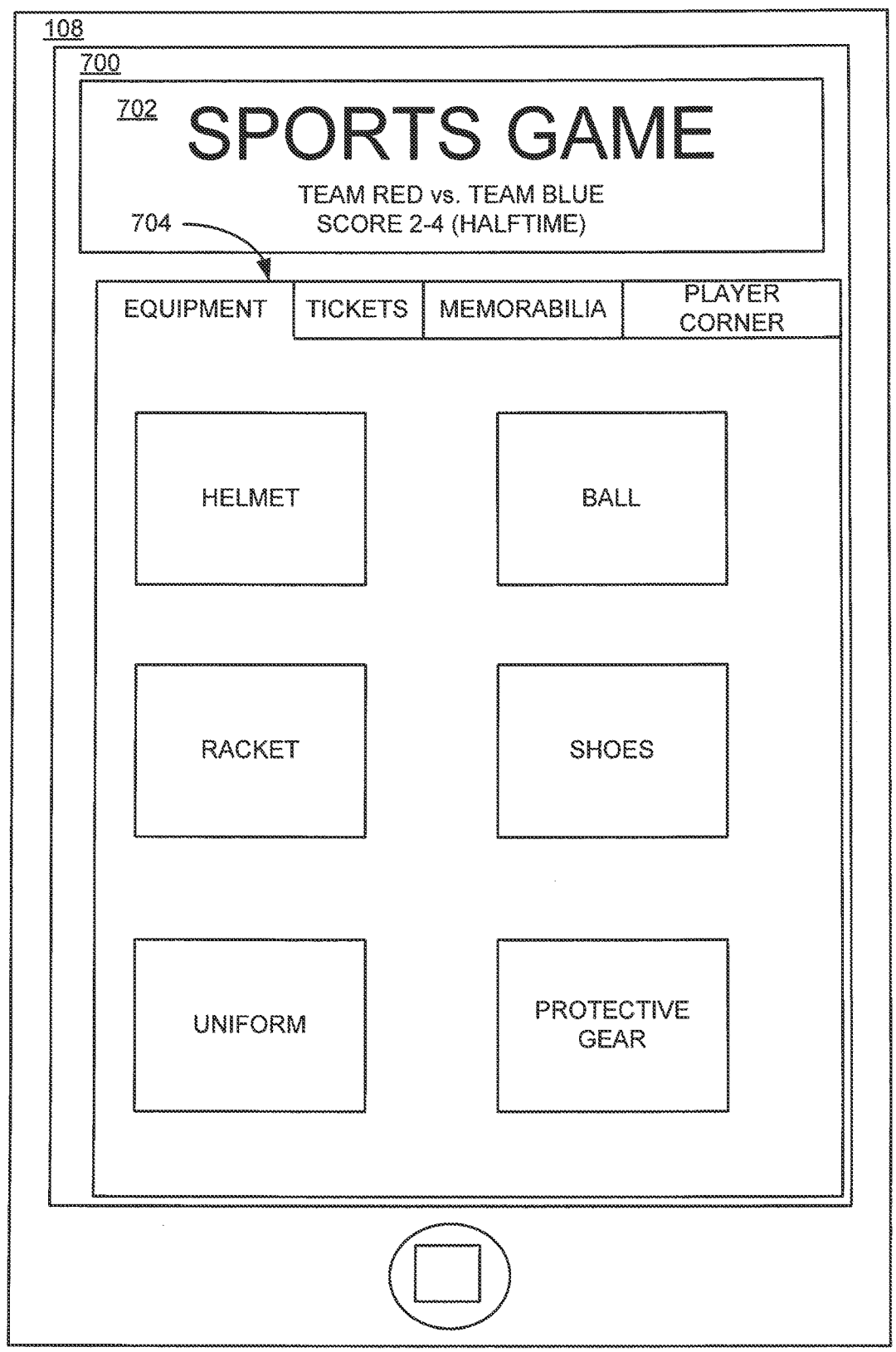
FIG. 7 depicts an example portion of a user interface provided by a user device that includes an example supplemental experience based on predetermined keywords associated with particular broadcast content.

FIG. 7 depicts an example portion of a user interface 700 provided by a user device 108 that includes an example supplemental experience. The supplemental experience is generated based on pre-determined keywords accessed by the curation module 204 and mapped to particular broadcast content in the curation database in a portion 704. As depicted in a portion 702, the content is identified and may include show metadata (e.g., a current score and time during a sports game) retrieved by the show metadata module 210.

The portion 704 includes one or more tabs each corresponding to a category associated with the content. For example, a category labelled "equipment" may include sub-categories or listings describing items for sale such as "helmet", "racket", "uniform", "ball", "shoes", and "protective gear." Upon selecting one of the links, the user may navigate to a more detailed listing and/or an interface including an option to purchase the item from one or more sellers in the online marketplace 104. Another category selectable by the user may include "tickets" where the user is guided through a series of interfaces that allow a user to select an upcoming game and seats within a stadium where the game is played. A category "memorabilia" may allow a user to enter a query for memorabilia related to the sports game and display results from the online marketplace 104 of listings describing memorabilia for sale. A category labelled "player corner" may allow a user to select a biography player of the game and view a collection of items for sale selected by the player.

Figure 8:
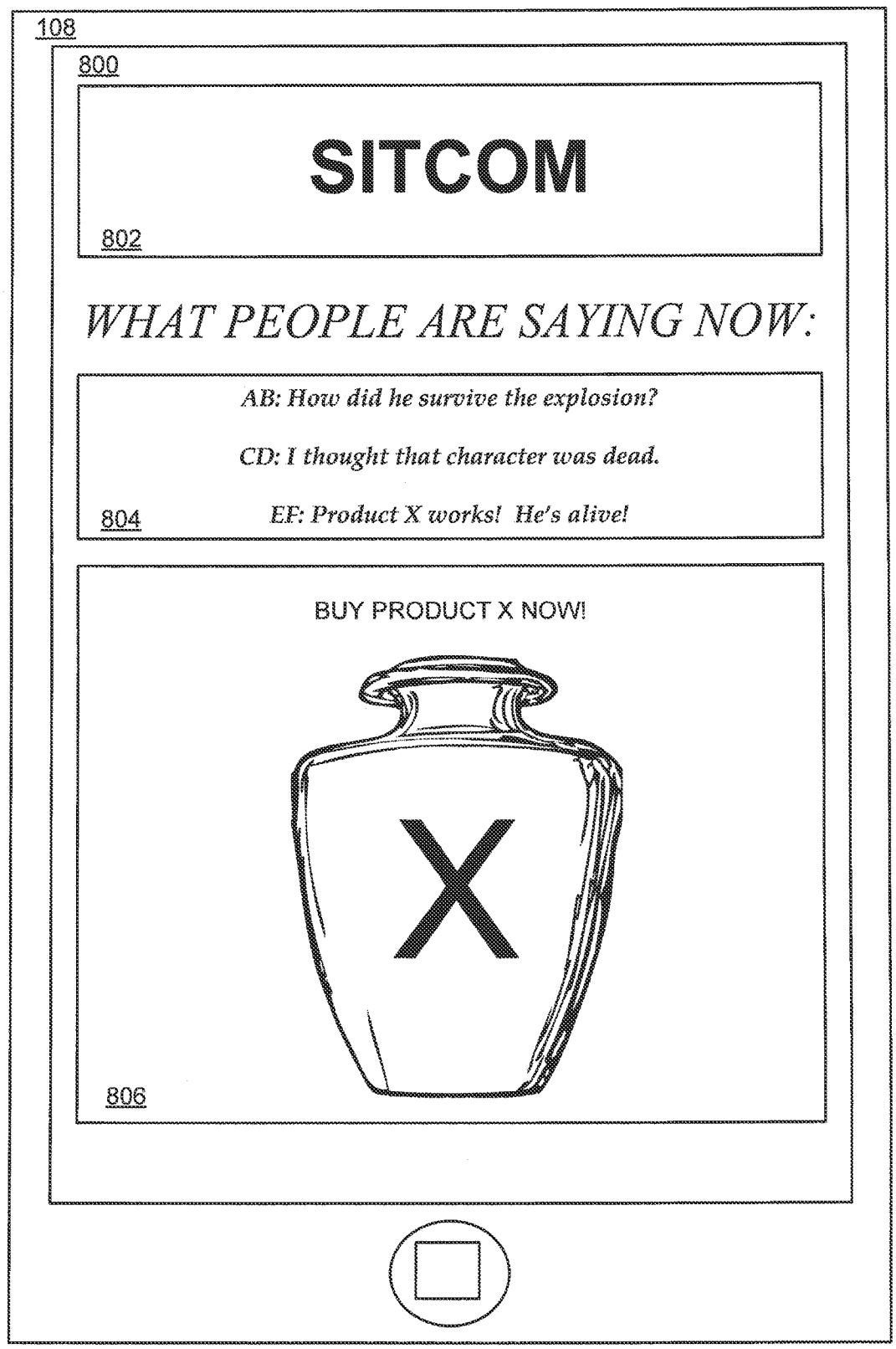
FIG. 8 depicts an example portion of a user interface provided by a user device that includes an example supplemental experience based on real-time media content about the broadcast content.

FIG. 8 depicts an example portion of a user interface 800 provided by a user device 108 that includes an example supplemental experience based on real-time media content about the broadcast content provided by the real-time media module 210. The user interface 800 may include a content identification 802, a real-time media interface 804, and a shopping interface 806.

The real-time media interface 804 may include a depiction real-time media that is collected concurrently with the broadcasting of the show or after the show has aired. The real-time media may include for example, a micro-blog feed, a social network feed, comments posted by viewers about the content, or the like. Based on the real-time media, one or more items for sale may be identified as being potentially relevant to viewers of the content by the real-time media module 208. Descriptions of the items for sale or listings describing the items for sale may be includes in the shopping interface 806. In other embodiments, categories or items identified by the curation module 204 may be depicted in the shopping interface 806.

Figure 9:
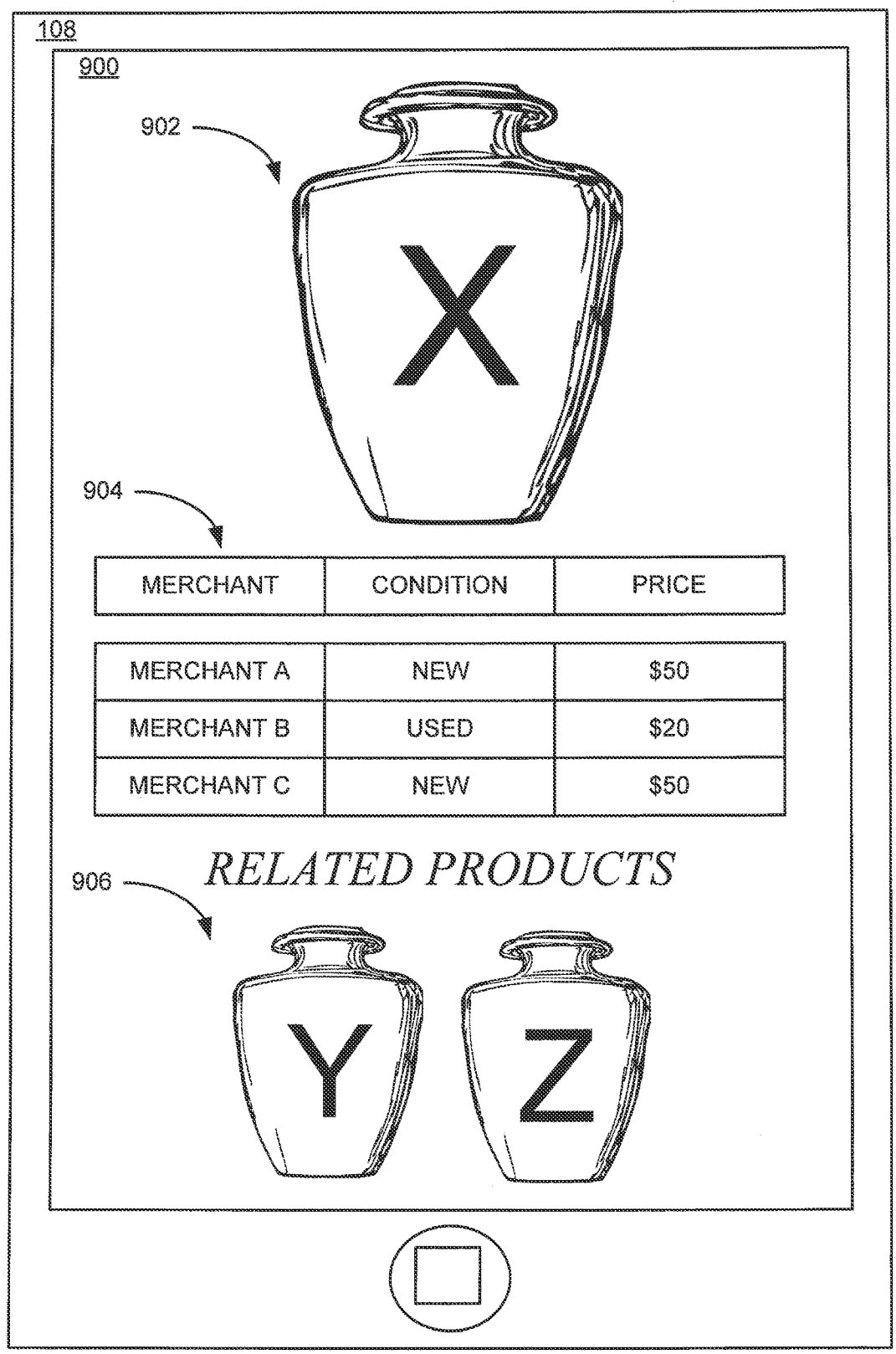
FIG. 9 depicts an example portion of a user interface provided by a user device that includes an example supplemental experience to purchase an item for sale in an online marketplace.

FIG. 9 depicts an example portion of a user interface 900 provided by a user device 108 that includes an example supplemental experience to purchase an item for sale in an online marketplace 104. The user interface 900 may include an item description 902, a list 904 of sellers offer the item for sale in the online marketplace 104, and descriptions 906 of items related to the item described by item description 902. The descriptions 906 may be retrieved from the online marketplace 906.

Figure 10:
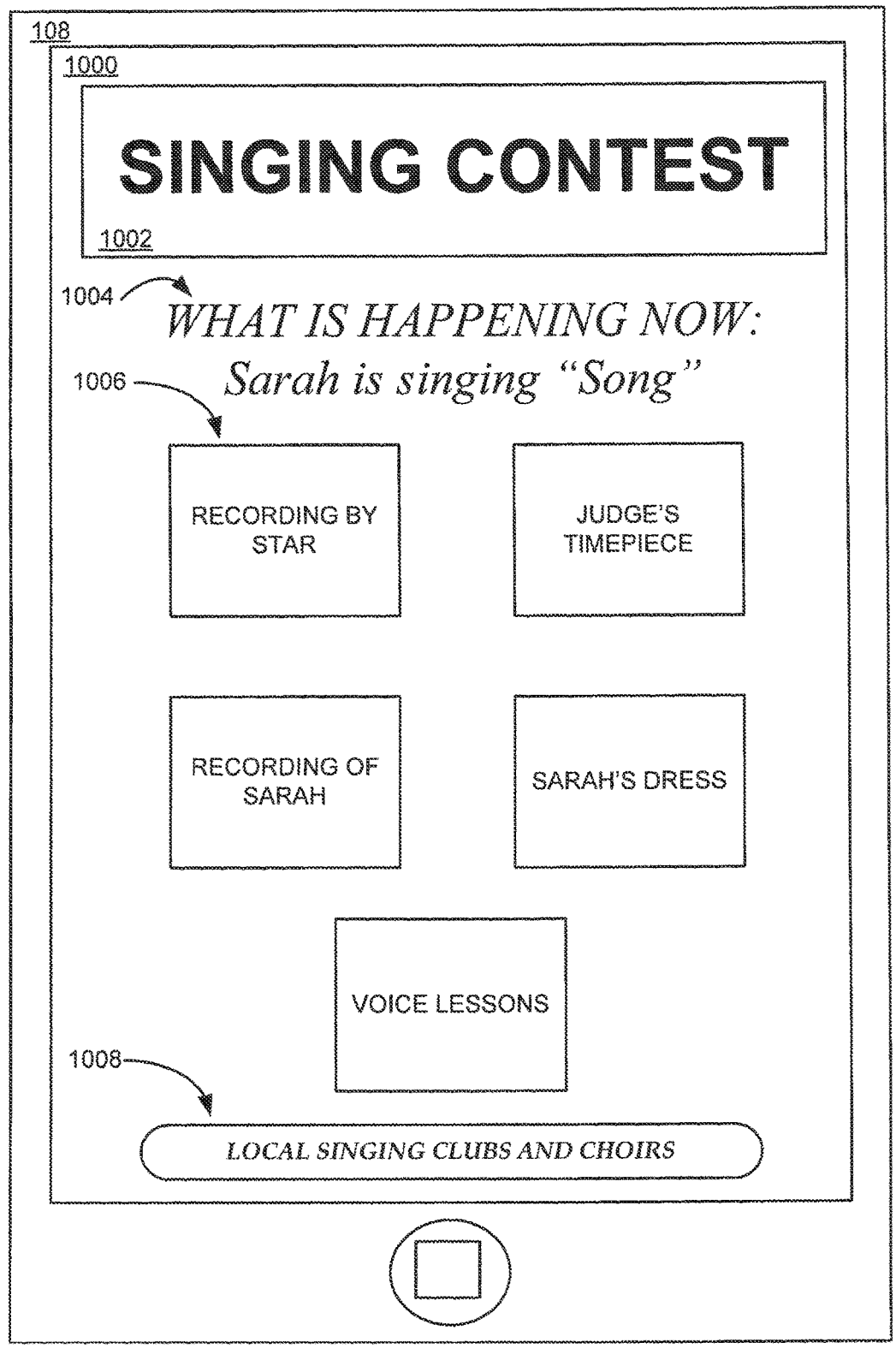
FIG. 10 depicts an example portion of a user interface provided by a user device that includes an example supplemental experience based on show meta-data and social aggregation data.

FIG. 10 depicts an example portion of a user interface 1000 provided by a user device 108 that includes an example supplemental experience based on show meta-data and social aggregation data. The user interface 1000 may include an identification of the content 1002. The interface 1000 may include a content identifier 1002, show metadata 1004, listings 1006 retrieved from the online marketplace 104 based on the show metadata, and a link 1008 to real-world activities related to the content.

Show metadata 1004 may include a status of the content, a description of a scene in the content, a score hoard, a leader board, or other metadata about the content. In some instances, the show metadata may be supplemented with real-time media in the interface 1000. The listings 1006 may be accessed from the online marketplace 104 based on keywords or categories identified by the curation module 204, the real-time media module 208, or the show metadata module 210.

The link 1008 may, upon being selected, cause the user to navigate to another interface that displays descriptions of real-world activities that are within the same geographic area as the user. The activities may include clubs, meet-ups, organizations, volunteer programs, local businesses, local classifieds, or the like.

Figure 11:
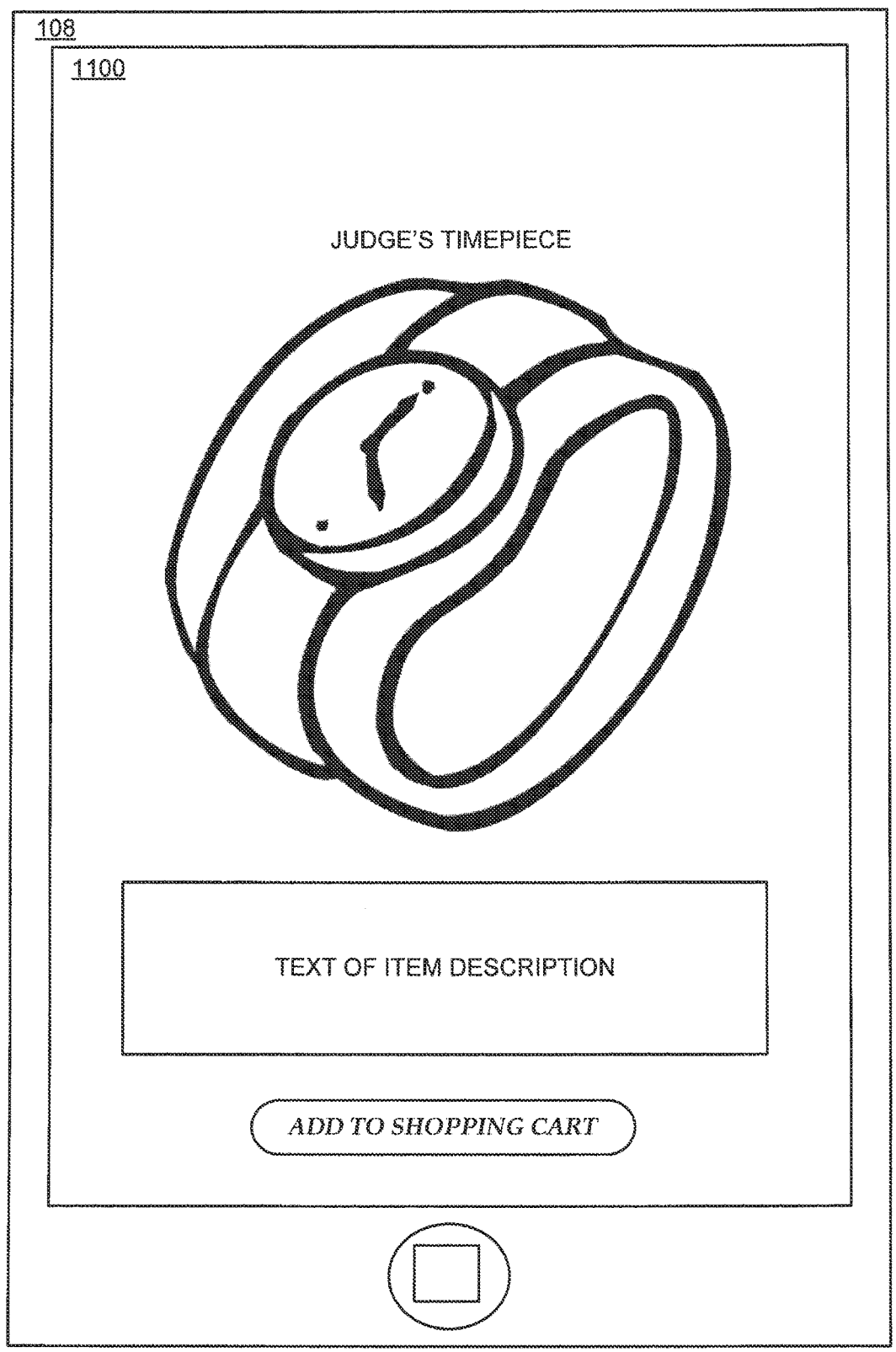
FIG. 11 depicts an example portion of a user interface provided by a user device that includes an example supplemental experience indicating additional information about a selected item for sale.

FIG. 11 depicts an example portion of a user interface 1100 provided by a user device 108 that includes an example supplemental experience indicating additional information about a selected item for sale. The interface 1100 includes an option to purchase the item for sale using the transaction module 214.

FIG. 12 depicts an example portion of a user interface 1200 provided by a user device 108 that includes an example supplemental experience to complete a transaction for the selected item for sale. The user interface 1200 may include an indication that describes items for sale that the user has placed in a shopping cart and may request information from the user that is used to complete the purchased. In some instances, the user may login to the online marketplace 104 and confirm stored information to complete the transaction.

Figure 13:
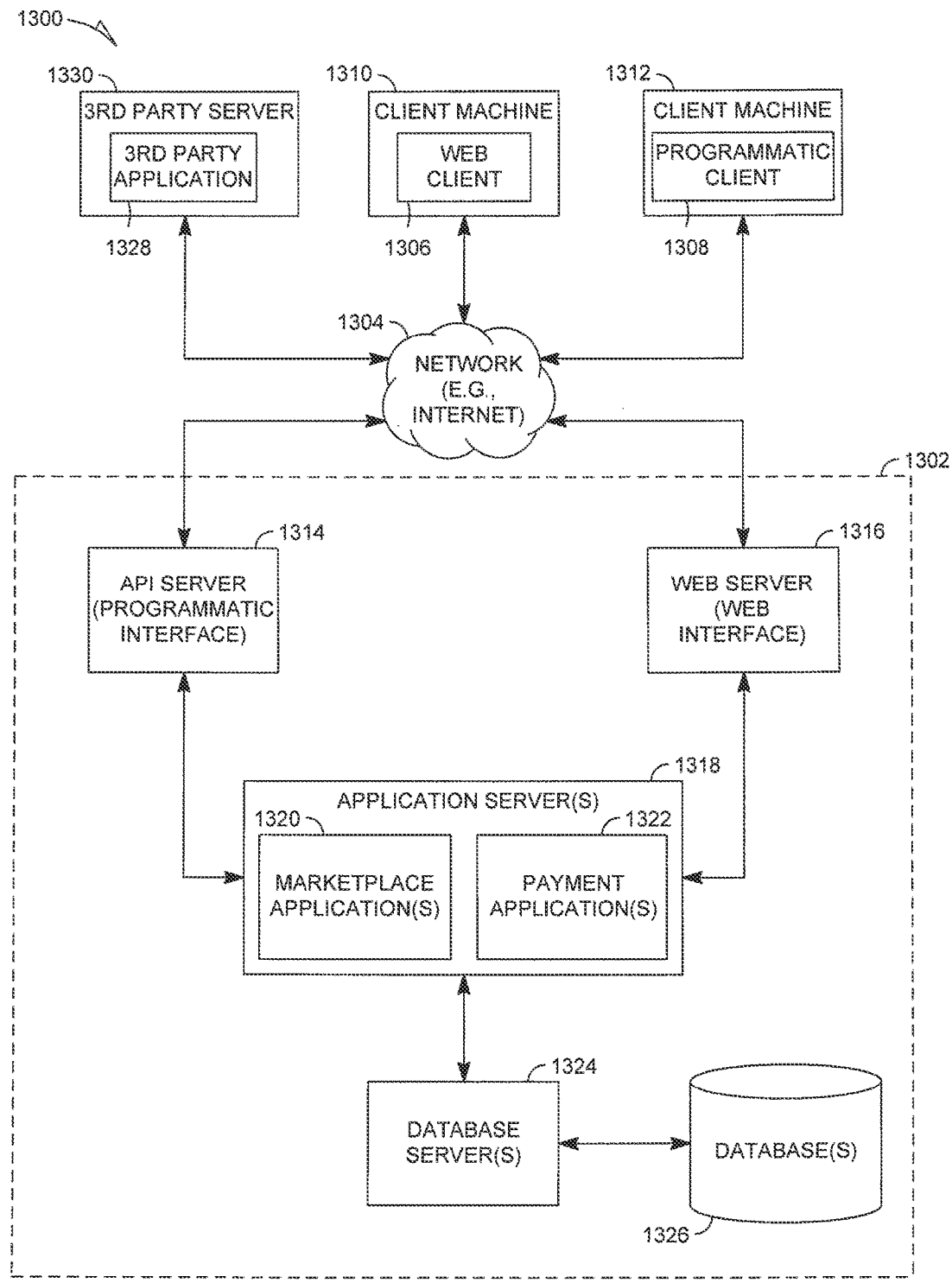
FIG. 13 is a network diagram depicting a client-server system, within which one example embodiment may be deployed

FIG. 13 is a network diagram depicting a client-server system 1300, within which one example embodiment may be deployed. A networked system 1302, in the example forms of a network-based marketplace or publication system, provides server-side functionality, via a network 1304 (e.g., the Internet or Wide Area Network (WAN)) to one or more clients. FIG. 13 illustrates, for example, a web client 1306 (e.g., a browser), and a programmatic client 1308 executing on respective client machines 1310 and 1312.

An Application Program Interface (API) server 1314 and a web server 1316 are coupled to, and provide programmatic and web interfaces respectively to, one or more application servers 1318. The application servers 1318 host one or more marketplace applications 1320 and payment applications 1322. The application servers 1318 are, in turn, shown to be coupled to one or more databases servers 1324 that facilitate access to one or more databases 1326. In some instances, a software development kit (SDK) may be provided to integrate the supplemental experience system 200 into third party applications.

The marketplace applications 1320 may provide a number of marketplace functions and services to users that access the networked system 1302. The payment applications 1322 may likewise provide a number of payment services and functions to users. The payment applications 1322 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 1320. While the marketplace and payment applications 1320 and 1322 are shown in FIG. 13 to both form part of the networked system 1302, it will be appreciated that, in alternative embodiments, the payment applications 1322 may form part of a payment service that is separate and distinct from the networked system 1302.

Further, while the system 1300 shown in FIG. 13 employs a client-server architecture, the present invention is of course not limited to such an architecture, and could equally well find application in a distributed, or peer-to-peer, architecture system, for example. The various marketplace and payment applications 1320 and 1322 could also be implemented as standalone software programs, which do not necessarily have networking capabilities.

The web client 1306 accesses the various marketplace and payment applications 1320 and 1322 via the web interface supported by the web server 1316. Similarly, the programmatic client 1308 accesses the various services and functions provided by the marketplace and payment applications 1320 and 1322 via the programmatic interface provided by the API server 1314. The programmatic client 1308 may, for example, be a seller application (e.g., the TurboLister application developed by eBay Inc., of San Jose, Calif.) to enable sellers to author and manage listings on the networked system 1302 in an off-line manner, and to perform batch-mode communications between the programmatic client 1308 and the networked system 1302.

FIG. 13 also illustrates a third party application 1328, executing on a third party server machine 1330, as having programmatic access to the networked system 1302 via the programmatic interface provided by the API server 1314. For example, the third party application 1328 may, utilizing information retrieved from the networked system 1302, support one or more features or functions on a website hosted by the third party. The third party website may, for example, provide one or more promotional, marketplace or payment functions that are supported by the relevant applications of the networked system 1302.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 14:
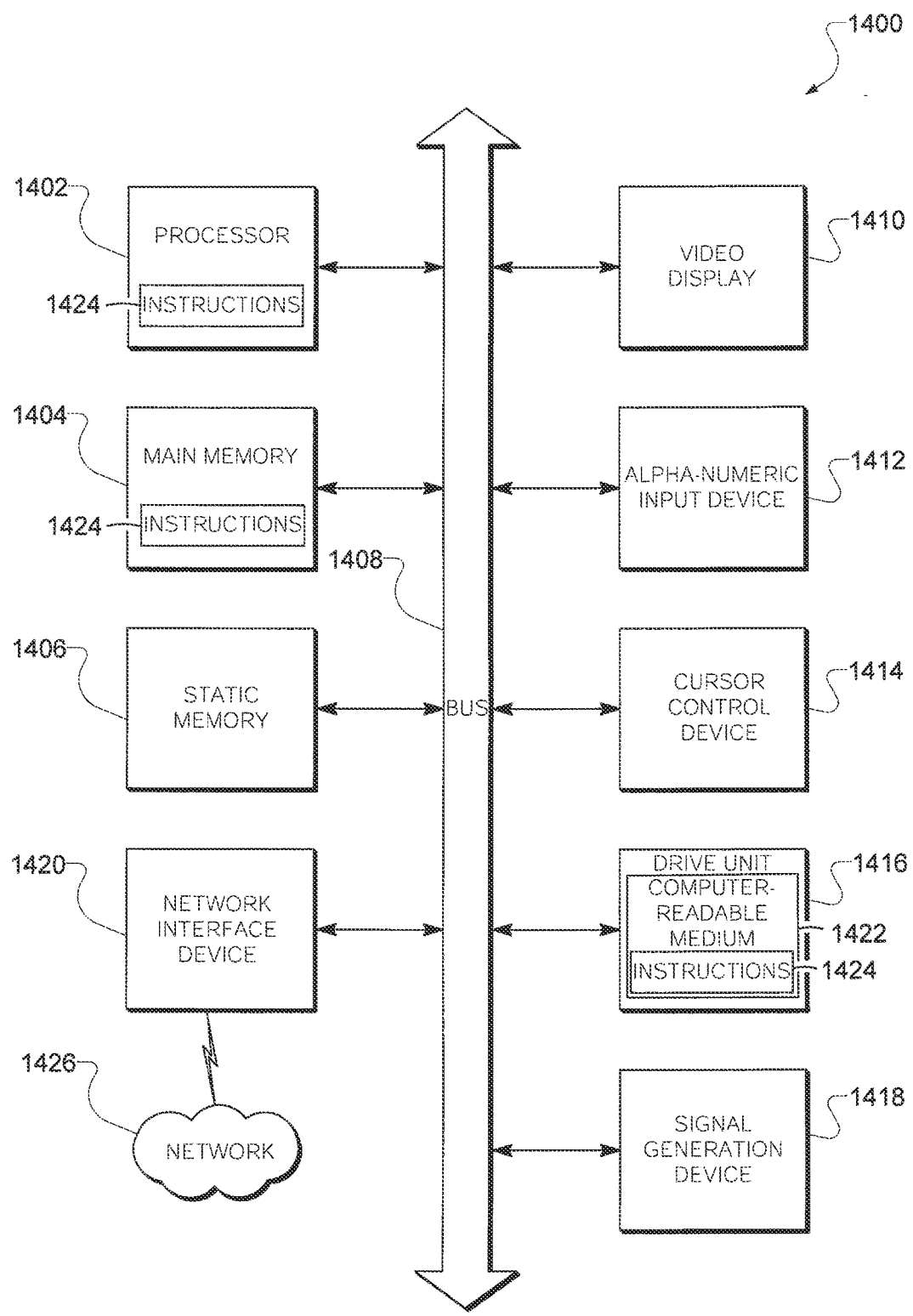
FIG. 14 is a diagrammatic representation of machine in the example form of a computer system within which a set of instructions, for causing the machine to perform any one or more of the methodologies discussed herein, may be executed.

FIG. 14 is a block diagram of machine in the example form of a computer system 1400 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU) or both), a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard or a touch-sensitive display screen), a user interface (UI) navigation device 1414 (e.g., a mouse), a disk drive unit 1416, a signal generation device 1418 (e.g., a speaker) and a network interface device 1420.

Machine-Readable Medium

The disk drive unit 1416 includes a machine-readable medium 1422 on which is stored one or more sets of instructions and data structures (e.g., software) 1424 embodying or utilized by any one or more of the methodologies or functions described herein. The instructions 1424 may also reside, completely or at least partially, within the main memory 1404 and/or within the processor 1402 during execution thereof by the computer system 1400, the main memory 1404 and the processor 1402 also constituting machine-readable media.

While the machine-readable medium 1422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1424 may further be transmitted or received over a communications network 1426 using a transmission medium. The instructions 1424 may be transmitted using the network interface device 1420 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

According to various embodiments, a system may include an identification module to identify, at a user device, concurrently viewed content assigned a content identifier via communication with one or more components of a home theatre and a curation module to identify one or more listings describing items for sale based on keywords mapped to the content identifier and provide a user interface including the listings to the user device separate from the home theatre.

A method may include identifying, at a user device, concurrently viewed content assigned a content identifier via communication with one or more components of a home theatre; identifying, one or more listings describing items for sale based on keywords mapped to the content identifier; and providing a user interface including the listings to the user device separate from the home theatre.

A non-transitory computer-readable medium having instructions embodied thereon, the instructions executable by one or more processors to perform operations comprising: identifying, at a user device, concurrently viewed content assigned a content identifier via communication with one or more components of a home theatre; identifying, using one or more processors, one or more listings describing items for sale based on keywords mapped to the content identifier; and providing a user interface including the listings to the user device separate from the home theatre.

The system may, in further embodiments, comprise one or more of the following characteristics, properties, or modules. In method or computer-readable medium embodiments or means-for embodiments, the embodiments may comprise the following characteristics, properties, or operations as performed by the modules. The identification module may be further to display a notification on the user device to allow the user to navigate to the user interface. The identification module may be further to provide a second user interface on the user device indicating a broadcast schedule. The identification module may be further to provide a second user interface on the user device indicating content stored in a queue. The system may further comprise a curation database accessible by the curation module and storing the mapping of the keywords to the content identifier. The identified listings may be included with a category in the online marketplace associated with the content identifier. The identified listings may be associated with multiple merchants offering the described item for sale. A real-time media module may access real-time media about the concurrently viewed content. The real-time media may be selected from the group consisting of blogs, micro-blogs, chat rooms, message boards, and comments on a webpage. The real-time media module may further identify a keyword within the real-time media relating to the concurrently viewed content and to retrieve additional listings from the online marketplace based on the identified keyword. The real-time media module may add the additional listings to the user interface. A show metadata module may access show metadata about the concurrently viewed content. The show metadata may be selected from the group consisting of a description of a concurrently viewed scene of the concurrently viewed content, a scoreboard, a leader board, a time on a game clock, an identification of an item appearing in the concurrently viewed content, and an actor or character in the a concurrently viewed scene of the concurrently viewed content. The show metadata module may identify a keyword within the show metadata relating to the concurrently viewed content and to retrieve additional listings from the online marketplace based on the identified keyword. The show metadata module may add the additional listings to the user interface. A social aggregation module may retrieve information about real-world activities relating to the concurrently viewed content. The real-world activities may be selected based on the geographic location of the user and from the group consisting of: clubs, meet-ups, organizations, volunteer programs, businesses, and classifieds. A transaction module may facilitate a transaction based on the one or more listings.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system, comprising:
an identification module configured to receive, at a user device, a content identifier assigned to concurrently viewed content, the content identifier received via communication with one or more components of a home theatre and the content identifier being separate from the concurrently viewed content;
a curation module configured to, using one or more processors, identify one or more sale listings in an online marketplace describing items for sale based on at least a first keyword mapped to the received content identifier and associated with the concurrently viewed content, and provide a user interface including the sale listings to the user device separate from the home theatre; and
a show metadata module configured to:
access show metadata about the concurrently viewed content, identify at least a second keyword within the show metadata relating to the concurrently viewed content, and
retrieve additional sale listings from the online marketplace based on the identified at least second keyword within the show metadata relating to the concurrently viewed content, wherein the at least first keyword is different from the at least second keyword.

2. The system of claim 1, wherein the identification module is further configured to display a notification on the user device to allow the user to navigate to the user interface.

3. The system of claim 1, wherein the identification module is further configured to provide a second user interface on the user device indicating a broadcast schedule.

4. The system of claim 1, wherein the identification module is further configured to provide a second user interface on the user device indicating content stored in a queue.

5. The system of claim 1, further comprising a curation database accessible by the curation module and storing the mapping of the at least a first keyword to the content identifier.

6. The system of claim 1, wherein the identified listings are included with a category in the online marketplace associated with the content identifier.

7. The system of claim 1, wherein the identified listings are associated with multiple merchants offering the described item for sale.

8. The system of claim 1, further comprising a real-time media module configured to access real-time media about the concurrently viewed content, the real-time media being different than the concurrently viewed content.

9. The system of claim 8, wherein the real-time media is selected from the group consisting of blogs, micro-blogs, chat rooms; message boards, and comments on a webpage.

10. The system of claim 1, wherein the show metadata is selected from the group consisting of a description of a concurrently viewed scene of the concurrently viewed content, a scoreboard, a leader board, and a time on a game clock.

11. The system of claim 1, wherein the show metadata module is to add the additional sale listings to the user interface.

12. The system of claim 1, further comprising a social aggregation module configured to retrieve information about real-world activities relating to the concurrently viewed content.

13. The system of claim 12, wherein the real-world activities are selected based on the geographic location of the user and from the group consisting of:
clubs, meet-ups, organizations, volunteer programs, businesses, and classifieds.

14. The system of claim 1, further comprising a transaction module configured to facilitate a transaction based on the one or more listings.

15. A system, comprising:
an identification module configured to identify, at a user device, concurrently viewed content assigned a content identifier via communication with one or more components of a home theatre;
a curation module configured to, using one or more processors, identify one or more listings describing items for sale based on keywords mapped to the content identifier and provide a user interface including the listings to the user device separate from the home theatre; and
a real-time media module configured to:
access real-time media about the concurrently viewed content,
identify a keyword within the real-time media relating to the concurrently viewed content, and
retrieve additional listings from the online marketplace based on the identified keyword.

16. The system of claim 15, wherein the real-time media module is configured to add the additional listings to the user interface.

17. A method, comprising:
receiving, at a user device, a content identifier of concurrently viewed content, via communication with one or more components of a home theatre, the content identifier being separate from the concurrently viewed content;
identifying, at the user device, the concurrently viewed content assigned the content identifier;
identifying, using one or more processors, one or more listings in an online marketplace describing items for sale based on at least a first keyword mapped to the content identifier;
providing a user interface including the listings to the user device separate from the home theatre;
accessing show metadata about the concurrently viewed content;
identifying at least a second keyword within the show metadata relating to the concurrently viewed content; and
retrieving additional listings from the online marketplace based on the identified at least second keyword within the show metadata relating to the concurrently viewed content, wherein the at least first keyword is different from the at least second keyword.

18. A non-transitory computer-readable medium having instructions embodied thereon, the instructions executable by one or more processors to perform operations comprising:
receiving, at a user device, a content identifier of concurrently viewed content via communication with one or more components of a home theatre, the content identifier being separate from the concurrently viewed content;

identifying, at the user device, the concurrently viewed content assigned the content identifier;
identifying, using one or more processors, one or more listings in an online marketplace describing items for sale based on at least a first keyword mapped to the content identifier;
providing a user interface including the listings to the user device separate from the home theatre;
accessing show metadata about the concurrently viewed content;
identifying at least a second keyword within the show metadata relating to the concurrently viewed content; and
retrieving additional listings from the online marketplace based on the identified at least second keyword within the show metadata relating to the concurrently viewed content, wherein the at least first keyword is different from the at least second keyword.

* * * * *